United States Patent
Jeong et al.

(10) Patent No.: US 10,885,824 B2
(45) Date of Patent: Jan. 5, 2021

(54) DISPLAY DRIVING DEVICE AND DISPLAY DEVICE INCLUDING THE SAME

(71) Applicant: SILICON WORKS CO., LTD., Daejeon (KR)

(72) Inventors: Hyun Woo Jeong, Daejeon (KR); Kwang Myoung Kang, Daejeon (KR); Yong Min Kim, Daejeon (KR); Ha Na Choi, Daejeon (KR); Da Sol Won, Daejeon (KR); Se Hyuk An, Daejeon (KR)

(73) Assignee: Silicon Works Co., Ltd., Daejeon-si (KR)

( * ) Notice: Subject to any disclaimer, the term of this patent is extended or adjusted under 35 U.S.C. 154(b) by 20 days.

(21) Appl. No.: 16/440,532

(22) Filed: Jun. 13, 2019

(65) Prior Publication Data
US 2019/0385504 A1 Dec. 19, 2019

(30) Foreign Application Priority Data
Jun. 15, 2018 (KR) .................. 10-2018-0069232

(51) Int. Cl.
*G09G 3/20* (2006.01)
*G09G 5/00* (2006.01)
(Continued)

(52) U.S. Cl.
CPC ............ *G09G 3/20* (2013.01); *G06F 3/0412* (2013.01); *G06F 3/0416* (2013.01); *G09G 5/008* (2013.01);
(Continued)

(58) Field of Classification Search
CPC .. G09G 3/20; G09G 5/008; G09G 2310/0254; G09G 2310/0275; G06F 3/0412; G06F 3/0416; G06F 3/044
See application file for complete search history.

(56) References Cited

U.S. PATENT DOCUMENTS

| 2020/0036381 A1* | 1/2020 | Tomar ................. G06F 3/0414 |
| 2020/0042071 A1* | 2/2020 | Jang .................... G06F 1/28 |
| 2020/0042118 A1* | 2/2020 | Mugiraneza ........... G06F 3/044 |

FOREIGN PATENT DOCUMENTS

| KR | 20180035551 A | 4/2018 |
| KR | 101872993 B1 | 7/2018 |

(Continued)

OTHER PUBLICATIONS

English abstract of KR101924417; retrieved from www.espacenet.com on Jun. 13, 2019.
(Continued)

*Primary Examiner* — Sejoon Ahn
(74) *Attorney, Agent, or Firm* — Polsinelli PC

(57) ABSTRACT

Embodiments of the present disclosure relate to a display driving device and a display device including the same. The display driving device includes a source driving circuit configured to convert image data of respective channels into source signals; a polarity control circuit configured to receive polarity data for the respective channels, and generate a polarity control signal for controlling polarities of the source signals depending on a logic combination of the polarity data; and a multiplexer circuit configured to output the source signals to data lines in response to the polarity control signal.

13 Claims, 7 Drawing Sheets

(51) Int. Cl.
  *G06F 3/041* (2006.01)
  *G06F 3/044* (2006.01)
(52) U.S. Cl.
  CPC ..... *G06F 3/044* (2013.01); *G09G 2310/0254* (2013.01); *G09G 2310/0275* (2013.01); *G09G 2310/0297* (2013.01); *G09G 2320/0247* (2013.01); *G09G 2320/0257* (2013.01)

(56) References Cited

FOREIGN PATENT DOCUMENTS

| | | |
|---|---|---|
| KR | 101879407 B1 | 7/2018 |
| KR | 101926521 B1 | 12/2018 |
| KR | 101924417 B1 | 2/2019 |

OTHER PUBLICATIONS

English abstract of KR101879407; retrieved from www.espacenet.com on Jun. 13, 2019.
English abstract of KR101872993; retrieved from www.espacenet.com on Jun. 13, 2019.
English abstract of KR101926521; retrieved from www.espacenet.com on Jun. 13, 2019.
English abstract of KR20180035551; retrieved from www.espacenet.com on Jun. 13, 2019.

\* cited by examiner

FIG. 3

|      | P0 | P1 | P2 | P3 | INVERSION |
|------|----|----|----|----|-----------|
| POL1 | 0  | 0  | 0  | 0  | + - + -   |
| POL2 | 0  | 0  | 1  | 0  | - + - +   |
| POL3 | 0  | 1  | 0  | 0  | + - - +   |
| POL4 | 0  | 1  | 1  | 0  | - + + -   |
| POL5 | 1  | 0  | 0  | 0  | + + - -   |
| POL6 | 1  | 0  | 1  | 0  | - - + +   |
| N/A  | 1  | 1  | 0  | 0  | N / A     |
| N/A  | 1  | 1  | 1  | 0  | N / A     |

DISPLAY DRIVING DEVICE AND DISPLAY DEVICE INCLUDING THE SAME

BACKGROUND

1. Technical Field

Various embodiments generally relate to a display device, and more particularly, to a display driving device and a display device including the same, capable of precisely controlling an inversion driving.

2. Related Art

Recently, a touch-sensitive display panel is applied to not only mobile terminals such as smart terminals but also various electronic devices such as notebook computers, monitors and home appliances. Such a display panel may be divided into an add-on type and an in-cell type depending on the position of a touch sensor. In order to make a display panel slim, an in-cell type touch technology in which an existing component such as a common electrode is utilized as a touch sensing electrode is applied to a display device.

If a data voltage (hereinafter referred to as a source signal) of the same polarity is continuously applied to a display panel, a problem may be caused in that a degradation occurs in the display panel. Thus, in a display driving device, by inversion-driving the polarity of a source signal in each frame, it is possible to solve the problem that a degradation occurs in the display panel.

In a display driving device which drives a touch-sensitive display panel, a touch sensing of the display panel and a display driving of the display panel are controlled utilizing a common voltage. In this regard, in the display driving device according to the conventional art, the common voltage is likely to fluctuate by a polarity change upon an inversion driving of changing the polarity of a source signal, and due to this fact, the inversion driving may become imprecise. As a consequence, a problem may be caused in that an image sticking or a flickering phenomenon occurs on the display panel.

Therefore, a technology capable of precisely controlling an inversion driving of a display driving device is demanded in the art.

SUMMARY

Various embodiments are directed to a display driving device and a display device including the same, capable of precisely controlling an inversion driving by using polarity data allocated to respective channels.

In an embodiment, a display driving device may include: a source driving circuit configured to convert image data of respective channels into source signals; a polarity control circuit configured to receive polarity data for the respective channels, and generate a polarity control signal for controlling polarities of the source signals depending on a logic combination of the polarity data; and a multiplexer circuit configured to output the source signals to data lines in response to the polarity control signal.

In an embodiment, a display device may include: a timing controller configured to provide an input signal in which a clock is embedded in a data packet including image data and polarity data of respective channels; and a display driving device configured to recover a clock signal from the input signal, recover the image data and the polarity data by using the clock signal, convert the image data of the respective channels into source signals, and control polarities of the source signals by the unit of a preset number of channels depending on a logic combination of the polarity data.

In an embodiment, a display driving device may include: a clock data recovery circuit configured to receive an input signal in which a clock is embedded in a data packet including image data and polarity data, recover a clock signal from the input signal, and recover the image data and the polarity data by using the clock signal; a data register circuit configured to store the image data and the polarity data recovered by the clock data recovery circuit; a latch circuit configured to latch the image data provided from the data register circuit; a source driving circuit configured to convert the image data of the respective channels of the latch circuit into source signals; a polarity control circuit configured to receive the polarity data for the respective channels from the data register circuit, and generate a polarity control signal for controlling polarities of the source signals by the unit of a preset number of channels depending on a logic combination of the polarity data; and a multiplexer circuit configured to output the source signals to data lines in response to the polarity control signal.

According to the embodiments, since an inversion driving is controlled by the unit of a preset number of channels depending on a logic combination of polarity data for respective channels, it is possible to improve the preciseness of the inversion driving.

Also, according to the embodiments, since an inversion driving is precisely controlled depending on a logic combination of polarity data for respective channels, it is possible to prevent an image sticking or a flicker phenomenon from occurring on a display panel by an imprecise inversion driving.

Further, according to the embodiments, since the validity of polarity data is checked by logically calculating the polarity data of respective channels by the unit of a preset number of channels, it is possible to more precisely control an inversion driving.

BRIEF DESCRIPTION OF THE DRAWINGS

FIG. 3 is a diagram illustrating a representation of an example of polarity inversion cases depending on polarity data illustrated in FIG. 1.

DETAILED DESCRIPTION

Figure 1:
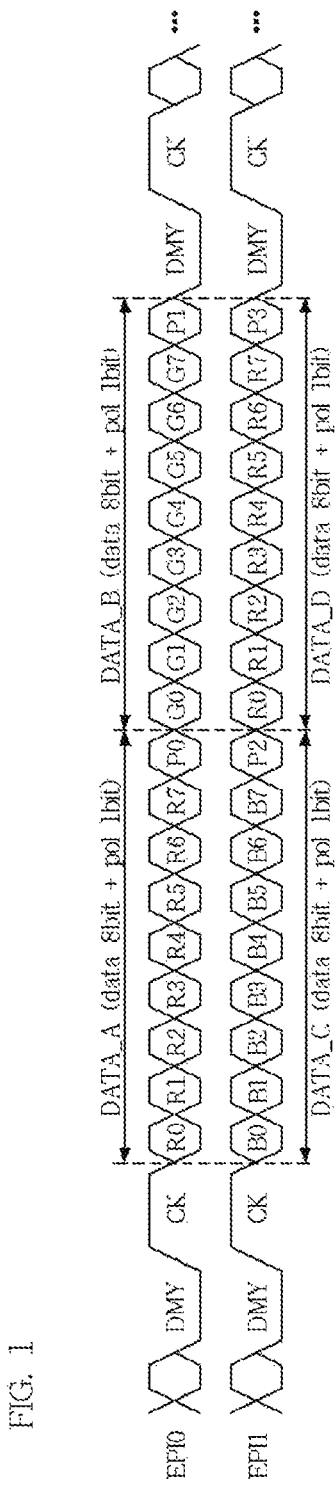
FIG. 1 is a representation of an example of a waveform diagram to assist in the explanation of a protocol of a display device in accordance with an embodiment.

Hereinafter, embodiments of the disclosure will be described in detail with reference to the accompanying drawings. The terms used herein and in the claims shall not be construed by being limited to general or dictionary meanings and shall be interpreted based on the meanings and concepts corresponding to technical aspects of the disclosure.

Embodiments described herein and configurations illustrated in the drawings are preferred embodiments of the disclosure, and, because they do not represent all of the technical features of the disclosure, there may be various equivalents and modifications that can be made thereto at the time of the present application.

Embodiments provide a display driving device and a display device including the same, capable of precisely controlling an inversion driving.

FIG. 1 is a representation of an example of a waveform diagram to assist in the explanation of a protocol of a display device in accordance with an embodiment.

Referring to FIG. 1, each of differential input signals EPI0 and EPI1 includes a dummy DMY, a clock CK and a data packet DATA_A and DATA_B or DATA_C and DATA_D. For instance, each of the differential input signals EPI0 and EPI1 may be formed by 22 UIs (unit intervals) including the dummy DMY of 2 bits, the clock CK of 2 bits and the data packet DATA_A and DATA_B or DATA_C and DATA_D of 18 bits for 2 channels.

The dummy DMY may be used to identify and recover data packets for channels. Such a dummy DMY may have a preset logic level. For example, the dummy DMY may have a logic level of LL.

The clock CK is positioned next to the dummy DMY, and may be used to recover a clock signal. Such a clock CK may have a preset logic level opposite to the dummy DMY. For example, the clock CK may have a logic level of HH.

Data packets DATA_A, DATA_B, DATA_C and DATA_D include image data R[0:7], G[0:7] and B[0:7] and polarity data P0, P1, P2 and P3. For instance, for one channel, the data packet DATA_A and DATA_B or DATA_C and DATA_D may be formed by the image data R[0:7], G[0:7] or B[0:7] of 8 bits and the polarity data P0, P1, P2 or P3 of 1 bit. In this way, the polarity data P0, P1, P2 or P3 may be allocated to each of channels.

The differential input signals EPI0 and EPI1 formed as described above may be generated by a timing controller (see FIG. 2), and may be provided to a display driving device 20 (see FIG. 2) through a pair of transmission lines.

Meanwhile, in the embodiment illustrated in FIG. 1, the differential input signals EPI0 and EPI1 are formed by including the polarity data P0, P1, P2 and P3 for controlling an inversion driving by the unit of 4 channels, in the data packets DATA_A, DATA_B, DATA_C and DATA_D. However, it is to be noted that the disclosure is not limited thereto, and it is possible to form the differential input signals EPI0 and EPI1 by including polarity data for controlling an inversion driving by the unit of 2 or more channels, in the data packets DATA_A, DATA_B, DATA_C and DATA_D.

Figure 2:
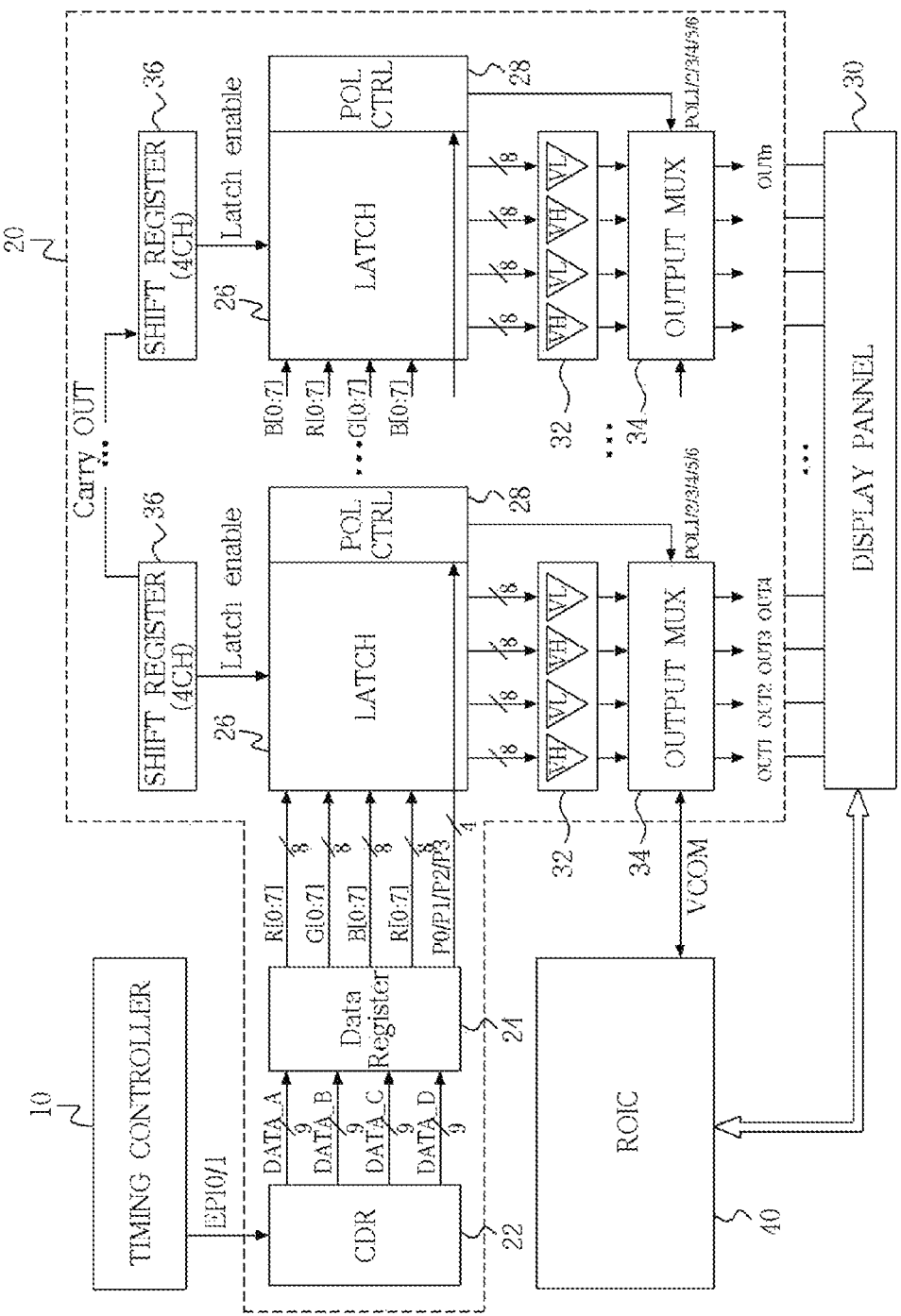
FIG. 2 is a block diagram illustrating a representation of an example of a display driving device and a display device including the same in accordance with an embodiment.

FIG. 2 is a block diagram illustrating a representation of an example of the display driving device 20 and a display device 100 including the same in accordance with an embodiment.

Referring to FIG. 2, the display device 100 includes the timing controller 10, the display driving device 20, a display panel 30, and a readout circuit 40.

The timing controller 10 receives image data and timing signals from a host system (not illustrated), embeds the clocks CK in the data packets DATA_A, DATA_B, DATA_C and DATA_D including the image data R[0:7], G[0:7] or B[0:7] and the polarity data P0, P1, P2 and P3 of respective channels, and provides the differential input signals EPI0 and EPI1 in which the clocks CK are embedded in the data packets DATA_A, DATA_B, DATA_C and DATA_D, to the display driving device 20.

The display driving device 20 receives the differential input signals EPI0 and EPI1 in which the clocks CK are embedded in the data packets DATA_A, DATA_B, DATA_C and DATA_D, recovers clock signals from the differential input signals EPI0 and EPI1, and recovers the image data R[0:7], G[0:7] and B[0:7] and the polarity data P0, P1, P2 and P3 by using the clock signals.

The display driving device 20 converts the image data R[0:7], G[0:7] and B[0:7] of respective channels into source signals, and controls the polarities of the source signals corresponding to the image data R[0:7], G[0:7] and B[0:7] of the respective channels by the unit of a preset number of channels depending on a logic combination of the polarity data P0, P1, P2 and P3. While the embodiment illustrated in FIG. 2 exemplifies that the polarities of source signals are controlled by the unit of 4 channels, it is to be noted that the disclosure is not limited thereto, and a configuration may be made such that the polarities of source signals are controlled by the unit of 2 or more channels.

The display panel 30 as a touch-sensitive panel may sense a touch by utilizing a common voltage VCOM of the display driving device 20. For example, the display panel 30 may include a pixel array (not illustrated) in which pixels are arranged in the form of a matrix, may display an image by applying source signals to the pixel array, and may sense whether a touch is made or not, in a capacitance type, by using combined common electrodes and touch electrodes included in the pixel array.

The readout circuit 40 may read sensing data by a touch to the display panel 30, and may provide the sensing data to a microcontroller (not illustrated). For example, the display panel 30 may include the combined common electrodes and touch electrodes. The respective touch electrodes are coupled to the readout circuit 40 through signal lines, and may be formed to a predetermined size including a plurality of pixels in consideration of a touch point size. For example, the readout circuit 40 may provide a touch driving signal Tx to each touch electrode of the display panel 30, and may receive a feedback signal Rx from the corresponding touch electrode. Such a readout circuit 40 reads sensing data by differentially amplifying the touch driving signal Tx and the feedback signal Rx for each touch electrode.

While the readout circuit 40 is formed separately from the display driving device 20 in the embodiment illustrated in FIG. 2, it is to be noted that the disclosure is not limited thereto, and the readout circuit 40 may be formed to be included in the display driving device 20.

With reference to FIG. 2, the detailed configuration of the display driving device 20 will be described below.

The display driving device 20 includes a clock data recovery circuit 22, a data register circuit 24, latch circuits 26, source driving circuits 32, polarity control circuits 28, and multiplexer circuits 34.

The clock data recovery circuit 22 receives the differential input signals EPI0 and EPI1 from the timing controller 10, recovers clock signals from the differential input signals EPI0 and EPI1, and recovers the data packets DATA_A, DATA_B, DATA_C and DATA_D including the image data R[0:7], G[0:7] and B[0:7] and the polarity data P0, P1, P2 and P3 by using the clock signals. The clock data recovery circuit 22 provides the recovered data packets DATA_A, DATA_B, DATA_C and DATA_D to the data register circuit 24.

The data register circuit 24 stores the image data R[0:7], G[0:7] and B[0:7] and the polarity data P0, P1, P2 and P3 for respective channels, included in the data packets DATA_A, DATA_B, DATA_C and DATA_D recovered by the clock data recovery circuit 22, provides the image data R[0:7], G[0:7] and B[0:7] to the latch circuits 26, and provides the polarity data P0, P1, P2 and P3 to the polarity control circuits 28.

The latch circuits 26 latch the image data R[0:7], G[0:7] and B[0:7] provided from the data register circuit 24, in synchronization with a latch enable signal, and provide the latched image data R[0:7], G[0:7] and B[0:7] to the source driving circuits 32. A shift register 36 may provide a latch enable signal to a corresponding latch circuit 26 in response to a carry signal.

The source driving circuits 32 convert the image data R[0:7], G[0:7] and B[0:7] of respective channels provided from the latch circuits 26, into source signals, and provide the source signals of the respective channels to the multiplexer circuits 34. The source driving circuits 32 may include digital-analog converters VH of a positive polarity and digital-analog converters VL of a negative polarity which convert the image data R[0:7], G[0:7] and B[0:7] as digital signals into source signals as analog signals. The digital-analog converters VH of a positive polarity convert the image data R[0:7], G[0:7] and B[0:7] into source signals of a positive polarity, and the digital-analog converters VL of a negative polarity convert the image data R[0:7], G[0:7] and B[0:7] into source signals of a negative polarity.

The polarity control circuits 28 receive the polarity data P0, P1, P2 and P3 for respective channels from the data register circuit 24, and generate polarity control signals POL1, POL2, POL3, POL4, POL5 and POL6 for controlling the polarities of source signals depending on a logic combination of the polarity data P0, P1, P2 and P3. In the polarity control signals POL1, POL2, POL3, POL4, POL5 and POL6, there may be set a plurality of polarity inversion cases corresponding to logic combinations of the polarity data P0, P1, P2 and P3. Detailed description for this will be made below with reference to FIG. 3.

The multiplexer circuits 34 may output the source signals of respective channels to corresponding data lines of the display panel 30 in response to the polarity control signals POL1, POL2, POL3, POL4, POL5 and POL6 from the polarity control circuits 28. For example, the multiplexer circuits 34 may include a plurality of switches, and the respective switches transfer source signals of a positive polarity and source signals of a negative polarity to corresponding data lines depending on a polarity inversion case corresponding to the polarity control signals POL1, POL2, POL3, POL4, POL5 and POL6.

FIG. 3 is a diagram illustrating a representation of an example of polarity inversion cases depending on the polarity data illustrated in FIG. 1.

Referring to FIG. 3, in the polarity control signals POL1, POL2, POL3, POL4, POL5 and POL6, there may be set a plurality of polarity inversion cases corresponding to logic combinations of the polarity data P0, P1, P2 and P3.

For instance, the polarity control circuits 28 generate the polarity control signal POL1 for controlling source signals of a 4-channel unit to polarities of +−+−, when a logic combination of the polarity data P0, P1, P2 and P3 is inputted as LLLL, and generate the polarity control signal POL2 for controlling source signals of a 4-channel unit to polarities of −+−+, when a logic combination of the polarity data P0, P1, P2 and P3 is inputted as LLHL.

In this way, the polarity control circuits 28 may generate the polarity control signals POL1, POL2, POL3, POL4, POL5 and POL6 for controlling polarities to +−+−, −+−+, +−−+, −++−, ++−− and −−++ according to logic combinations LLLL, LLHL, LHLL, LHHL, HLLL and HLHL of the polarity data P0, P1, P2 and P3.

In the embodiment of FIG. 3, polarity inversion cases are set depending on a logic combination of the polarity data P0, P1 and P2 to control the polarities of source signals by the unit of 4 channels, and the polarity data P3 is processed as "don't care." However, in the case where a unit of channels for controlling polarities is extended, a plurality of polarity inversion cases for controlling the polarities of source signals of respective channels may be set in polarity control signals depending on a logic combination of all the polarity data P0, P1, P2 and P3.

Figure 4:
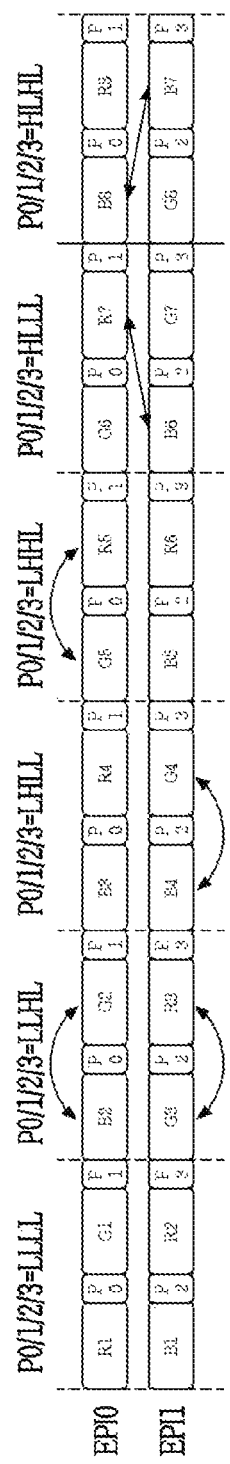
FIG. 4 is a diagram illustrating a representation of an example of polarity data included in input signals of a timing controller illustrated in FIG. 2.
Figure 5:
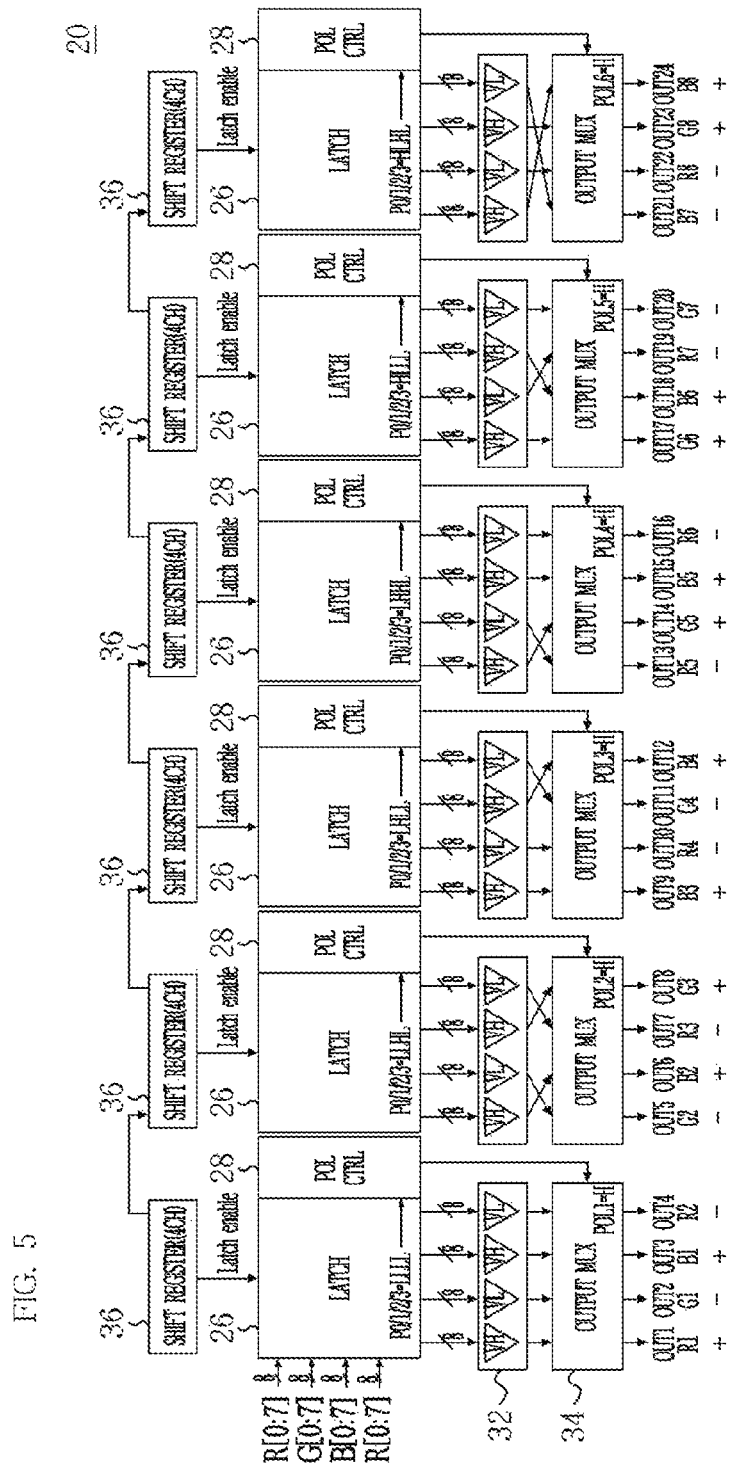
FIG. 5 is a representation of an example of a diagram to assist in the explanation of an inversion driving of the display driving device depending on the polarity data of FIG. 4.

FIG. 4 is a diagram illustrating a representation of an example of the polarity data P0, P1, P2 and P3 included in the input signals EPI0 and EPI1 of the timing controller 10 illustrated in FIG. 2, and FIG. 5 is a representation of an example of a diagram to assist in the explanation of an inversion driving of the display driving device 20 depending on the polarity data P0, P1, P2 and P3 of FIG. 4.

Referring to FIGS. 4 and 5, the display driving device 20 receives the image data R[0:7], G[0:7] and B[0:7] and the polarity data P0, P1, P2 and P3 by the unit of 4 channels. It is exemplified that the polarity data P0, P1, P2 and P3 are applied to the logic levels of LLLL, LLHL, LHLL, LHHL, HLLL and HLHL by the unit of 4 channels.

The latch circuits 26 latch the image data R[0:7], G[0:7] and B[0:7] in response to the latch enable signal of shift registers 36, and provide them to the source driving circuits 32.

The source driving circuits 32 convert the image data R[0:7], G[0:7] and B[0:7] of respective channels into source signals of a positive polarity and a negative polarity, and provide them to the multiplexer circuits 34.

The polarity control circuits 28 generate the polarity control signals POL1, POL2, POL3, POL4, POL5 and POL6 for controlling the polarities of the source signals depending on a logic combination of the polarity data P0, P1, P2 and P3, and provide them to the multiplexer circuits 34. For instance, the polarity control signal POL1 is activated in the case where a logic combination of the polarity data P0, P1, P2 and P3 is LLLL, the polarity control signal POL2 is activated in the case where a logic combination of the polarity data P0, P1, P2 and P3 is LLHL, the polarity control signal POL3 is activated in the case where a logic combination of the polarity data P0, P1, P2 and P3 is LHLL, the polarity control signal POL4 is activated in the case where a logic combination of the polarity data P0, P1, P2 and P3 is LHHL, the polarity control signal POL5 is activated in the case where a logic combination of the polarity data P0, P1, P2 and P3 is HLLL, and the polarity control signal POL6 is activated in the case where a logic combination of the polarity data P0, P1, P2 and P3 is HLHL.

The multiplexer circuits 34 output the source signals of the respective channels to corresponding data lines of the display panel 30 in response to the polarity control signals POL1, POL2, POL3, POL4, POL5 and POL6 from the polarity control circuits 28. For example, the multiplexer circuits 34 output source signals to data lines by inverting the polarities of channels into +−+− in the case where the polarity control signal POL1 is activated, output source signals to data lines by inverting the polarities of channels into −+−+ in the case where the polarity control signal POL2 is activated, output source signals to data lines by inverting the polarities of channels into +−−+ in the case where the polarity control signal POL3 is activated, output source signals to data lines by inverting the polarities of channels into −+++− in the case where the polarity control signal POL4 is activated, output source signals to data lines by inverting the polarities of channels into ++−− in the case where the polarity control signal POL5 is activated, and output source signals to data lines by inverting the polarities of channels into −−++ in the case where the polarity control signal POL6 is activated.

In this way, in the present embodiment, since an inversion driving is controlled by the unit of a preset number of channels depending on a logic combination of polarity data for respective channels, it is possible to improve the preciseness of the inversion driving.

Also, in the present embodiment, since an inversion driving is precisely controlled depending on a logic combination of polarity data for respective channels, it is possible to prevent an image sticking or a flicker phenomenon from occurring on a display panel by an imprecise inversion driving.

Figure 6:
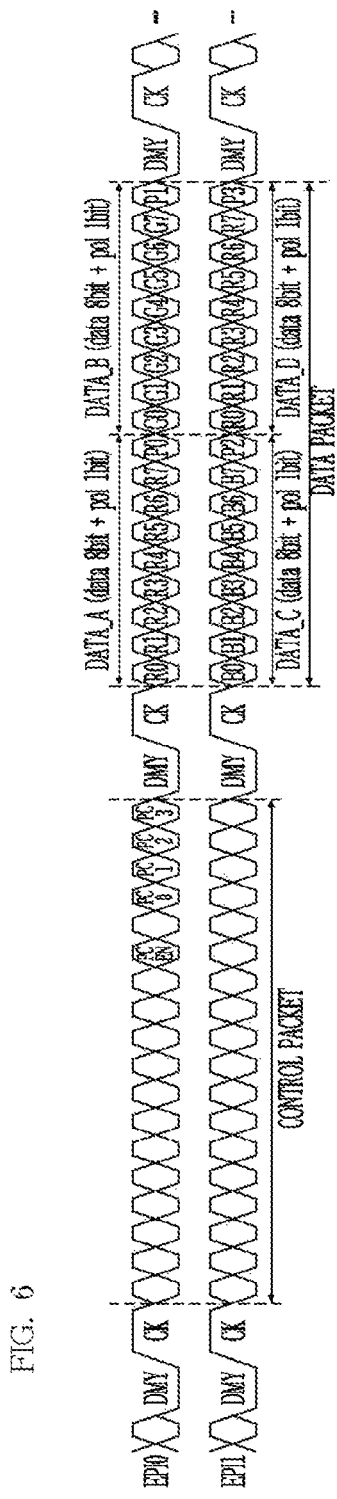
FIG. 6 is a representation of an example of a waveform diagram to assist in the explanation of a protocol of a display device in accordance with an embodiment.

FIG. 6 is a representation of an example of a waveform diagram to assist in the explanation of a protocol of a display device in accordance with an embodiment.

Referring to FIG. 6, each of differential input signals EPI0 and EPI1 includes a dummy DMY, a clock CK and a control packet, and includes a dummy DMY, a clock CK and a data packet DATA_A and DATA_B or DATA_C and DATA_D.

The dummy DMY may be used to identify a control packet and a data packet for channels. Such a dummy DMY may have a preset logic level. For example, the dummy DMY may have a logic level of LL.

The clock CK is positioned next to the dummy DMY, and may be used to recover a clock signal. Such a clock CK may have a preset logic level opposite to the dummy DMY. For example, the clock CK may have a logic level of HH.

The control packet includes polarity check enable data PCEN and polarity check data PC0, PC1, PC2 and PC3 for checking the validities of polarity data P0, P1, P2 and P3 included in data packets DATA_A, DATA_B, DATA_C and DATA_D.

The data packets DATA_A, DATA_B, DATA_C and DATA_D include image data R[0:7], G[0:7] and B[0:7] and the polarity data P0, P1, P2 and P3. For instance, for one channel, the data packet DATA_A and DATA_B or DATA_C and DATA_D may be formed by the image data R[0:7], G[0:7] or B[0:7] of 8 bits and the polarity data P0, P1, P2 or P3 of 1 bit.

The differential input signals EPI0 and EPI1 formed as described above may be generated by a timing controller 10 (see FIG. 7), and may be provided to a display driving device 20 (see FIG. 7) through a pair of transmission lines.

Meanwhile, in the embodiment illustrated in FIG. 6, the differential input signals EPI0 and EPI1 are formed by including the polarity data P0, P1, P2 and P3 for controlling an inversion driving by the unit of 4 channels, in the data packets DATA_A, DATA_B, DATA_C and DATA_D, and by including the polarity check data PC0, PC1, PC2 and PC3 of 4 channels for checking the validities of the polarity data P0, P1, P2 and P3 in the control packet. However, it is to be noted that the disclosure is not limited thereto, and it is possible to form the differential input signals EPI0 and EPI1 by including polarity data for controlling an inversion driving by the unit of 2 or more channels, in the data packets DATA_A, DATA_B, DATA_C and DATA_D.

Figure 7:
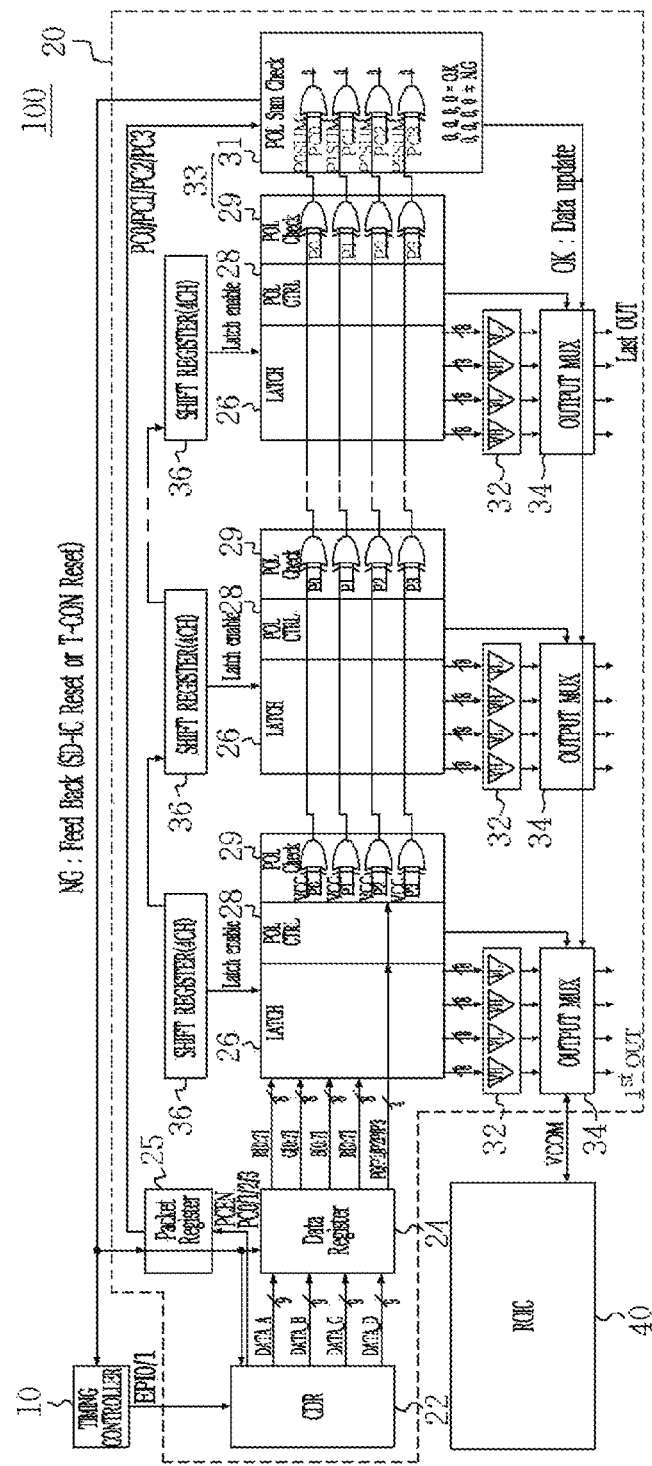
FIG. 7 is a block diagram illustrating a representation of an example of a display driving device and a display device including the same in accordance with an embodiment.

FIG. 7 is a block diagram illustrating a representation of an example of the display driving device and a display device 100 including the same in accordance with an embodiment. Hereinbelow, descriptions for components overlapping with those of FIG. 2 will be replaced by the descriptions of FIG. 2.

Referring to FIG. 7, the display device 100 includes the timing controller 10, the display driving device 20, a display panel (not illustrated), and a readout circuit 40.

The timing controller 10 receives image data and timing signals from a host system (not illustrated), embeds the clock CK in the control packet including the polarity check enable data PCEN and the polarity check data PC0, PC1, PC2 and PC3 for checking the validities of the polarity data P0, P1, P2 and P3, and embeds the clock CK in the data packets DATA_A, DATA_B, DATA_C and DATA_D including the image data R[0:7], G[0:7] and B[0:7] and the polarity data P0, P1, P2 and P3 of respective channels. The timing controller 10 provides the differential input signals EPI0 and EPI1 including the control packet and the data packets DATA_A, DATA_B, DATA_C and DATA_D to the display driving device 20.

The display driving device 20 recovers clock signals from the differential input signals EPI0 and EPI1, and recovers the image data R[0:7], G[0:7] and B[0:7], the polarity data P0, P1, P2 and P3, the polarity check enable data PCEN and the polarity check data PC0, PC1, PC2 and PC3 by using the clock signals.

The display driving device 20 converts the image data R[0:7], G[0:7] and B[0:7] of respective channels into source signals, and controls the polarities of the source signals corresponding to the image data R[0:7], G[0:7] and B[0:7] of the respective channels by the unit of a preset number of channels depending on a logic combination of the polarity data P0, P1, P2 and P3. Further, the display driving device 20 checks the validities of the polarity data P0, P1, P2 and P3 by logically calculating the polarity data P0, P1, P2 and P3 of respective channels.

Referring to FIG. 7, the display driving device 20 includes a clock data recovery circuit 22, a data register circuit 24, a packet register circuit 25, latch circuits 26, source driving circuits 32, polarity control circuits 28, a polarity check circuit 33, and multiplexer circuits 34.

The clock data recovery circuit 22 receives the differential input signals EPI0 and EPI1 from the timing controller 10, recovers clock signals from the differential input signals EPI0 and EPI1, and recovers the data packets DATA_A, DATA_B, DATA_C and DATA_D including the image data R[0:7], G[0:7] and B[0:7] and the polarity data P0, P1, P2 and P3 and the control packet including the polarity check enable data PCEN and the polarity check data PC0, PC1, PC2 and PC3 by using the clock signals.

The clock data recovery circuit 22 provides the recovered data packets DATA_A, DATA_B, DATA_C and DATA_D to the data register circuit 24, and provides the recovered polarity check enable data PCEN and polarity check data PC0, PC1, PC2 and PC3 to the packet register circuit 25.

The packet register circuit 25 provides the polarity check enable data PCEN and the polarity check data PC0, PC1, PC2 and PC3 which are recovered by the clock data recovery circuit 22, to the polarity check circuit 33.

The polarity control circuits 28 generate polarity control signals POL1, POL2, POL3, POL4, POL5 and POL6 for controlling the polarities of source signals depending on a logic combination of the polarity data P0, P1, P2 and P3. In the polarity control signals POL1, POL2, POL3, POL4, POL5 and POL6, there may be set a plurality of polarity inversion cases corresponding to logic combinations of the polarity data P0, P1, P2 and P3. Description for this will be replaced by the description of FIG. 3.

The polarity check circuit 33 logically calculates the polarity data P0, P1, P2 and P3 by coupling them in cascade when the polarity check enable data PCEN is enabled, and checks the validities of the polarity data P0, P1, P2 and P3 by comparing logically calculated values SUM with the polarity check data PC0, PC1, PC2 and PC3 corresponding to values calculated in advance. The polarity check data PC0, PC1, PC2 and PC3 may be defined as values obtained by logically calculating in advance the polarity data P0, P1, P2 and P3 of respective channels in the timing controller 10. For instance, the polarity check circuit 33 may include first logic circuits 29 which logically calculate the polarity data P0, P1, P2 and P3 by coupling them in cascade and a second logic circuit 31 which compares the logically calculated values SUM and the values calculated in advance.

Such a polarity check circuit 33 provides a data update signal OK to the multiplexer circuits 34 in the case where the logically calculated values SUM and the values calculated in advance match each other, and provides a reset signal NG to the timing controller 10 and at least one of internal circuits in the case where the logically calculated values SUM and the values calculated in advance do not match each other. The internal circuits may be set as the clock data recovery circuit 22, the data register circuit 24 and the packet register circuit 25. In the case where the reset signal NG is applied at least a reference number of times within a predetermined reference time, the timing controller 10 may disable the polarity check enable data PCEN.

In the case where the data update signal OK provided from the polarity check circuit 33 is enabled, the multiplexer circuits 34 may output source signals of respective channels to corresponding data lines of the display panel 30 in response to the polarity control signals POL1, POL2, POL3, POL4, POL5 and POL6. Description for this will be replaced by the description of FIGS. 4 and 5.

As is apparent from the above descriptions, according to the embodiments, since an inversion driving is controlled by the unit of a preset number of channels depending on a logic combination of polarity data for respective channels, it is possible to improve the preciseness of the inversion driving.

Also, according to the embodiments, since an inversion driving is precisely controlled depending on a logic combination of polarity data for respective channels, it is possible to prevent an image sticking or a flicker phenomenon from occurring on a display panel by an imprecise inversion driving.

Further, according to the embodiments, since the validity of polarity data is checked by logically calculating the polarity data of respective channels by the unit of a preset number of channels, it is possible to more precisely control an inversion driving.

While various embodiments have been described above, it will be understood to those skilled in the art that the embodiments described are by way of example only. Accordingly, the disclosure described herein should not be limited based on the described embodiments.

What is claimed is:

1. A display driving device comprising: a source driving circuit configured to convert image data of respective channels into source signals; a polarity control circuit configured to receive polarity data for the respective channels, and generate a polarity control signal for controlling polarities of the source signals depending on a logic combination of the polarity data; a multiplexer circuit configured to output the source signals to data lines in response to the polarity control signal, a clock data recovery circuit configured to receive an input signal in which a clock is embedded in a data packet including the image data and the polarity data, recover a clock signal from the input signal, and recover the image data and the polarity data by using the clock signal, and a data register circuit configured to store the image data and the polarity data recovered by the clock data recovery circuit, provide the image data to the source driving circuit, and provide the polarity data to the polarity control circuit.

2. The display driving device according to claim 1, wherein the polarity control circuit logically combines the polarity data by the unit of a preset number of channels, and controls polarities of the source signals by the unit of the preset number of channels depending on a logic combination of the polarity data.

3. The display driving device according to claim 1, wherein the polarity data are allocated to the channels, respectively.

4. The display driving device according to claim 1, wherein, in the data packet, at least one of data bits is set as the polarity data for each of the channels.

5. The display driving device according to claim 1, wherein the multiplexer circuit outputs the source signals to the data lines corresponding thereto, by utilizing a common voltage of a readout circuit which reads sensing data by a touch to a display panel.

6. A display device comprising: a timing controller configured to provide an input signal in which a clock is embedded in a data packet including image data and polarity data of respective channels; and a display driving device configured to recover a clock signal from the input signal, recover the image data and the polarity data by using the clock signal, convert the image data of the respective channels into source signals, and control polarities of the source signals by the unit of a preset number of channels depending on a logic combination of the polarity data, wherein the display driving device comprises: a source driving circuit configured to convert the image data of the respective channels into the source signals; a polarity control circuit configured to receive the polarity data for the respective channels, and generate a polarity control signal for controlling polarities of the source signals by the unit of the preset number of channels depending on a logic combination of the polarity data; and a multiplexer circuit configured to output the source signals to data lines in response to the polarity control signal, and wherein the polarity control circuit controls polarities of the source signals by the unit of the preset number of channels depending on a logic combination of the polarity data of the unit of the preset number of channels.

7. The display device according to claim 6, wherein, in the data packet, at least one of data bits is set as the polarity data for each of the channels.

8. The display device according to claim 6, wherein the polarity data are allocated to the channels, respectively.

9. A display driving device comprising: a clock data recovery circuit configured to receive an input signal in which a clock is embedded in a data packet including image data and polarity data, recover a clock signal from the input signal, and recover the image data and the polarity data by using the clock signal; a data register circuit configured to store the image data and the polarity data recovered by the clock data recovery circuit; a latch circuit configured to latch the image data provided from the data register circuit; a source driving circuit configured to convert the image data of the respective channels of the latch circuit into source signals; a polarity control circuit configured to receive the polarity data for the respective channels from the data register circuit, and generate a polarity control signal for controlling polarities of the source signals by the unit of a preset number of channels depending on a logic combination of the polarity data; and a multiplexer circuit configured to output the source signals to data lines in response to the polarity control signal, wherein, in the data packet, at least one of data bits is set as the polarity data for each of the channels.

10. The display driving device according to claim 9, wherein a plurality of polarity inversion cases corresponding to logic combinations of the polarity data of the unit of the preset number of channels are set in the polarity control signal.

11. A display driving device comprising: a polarity control circuit configured to receive polarity data for respective channels, and generate a polarity control signal for controlling polarities of source signals depending on a logic combination of the polarity data; a polarity check circuit configured to check validities of the polarity data by logically calculating the polarity data, and activate an update signal in the case where the polarity data are checked as valid; and a multiplexer circuit configured to output the source signals to data lines in response to the polarity control signal when the update signal is activated, wherein the polarity check circuit provides a reset signal to a timing controller and at least one of internal circuits in the case where the polarity data are checked as invalid, and wherein the polarity check circuit checks the polarities of the polarity data by comparing values obtained by logically calculating the polarity data by the unit of the preset number of channels and polarity check data corresponding to values calculated in advance.

12. The display driving device according to claim 11, further comprising: a clock data recovery circuit configured to receive an input signal in which a clock is embedded in a data packet and a control packet, recover a clock signal from the input signal, and recover at least one of the image data, the polarity data and the polarity check data by using the clock signal.

13. The display driving device according to claim 12, wherein at least one of bits of the data packet is set as the polarity data for each of the channels, and at least one of bits of the control packet is set as the polarity check data.

* * * * *